US006529937B1

(12) United States Patent
Murphy, Jr. et al.

(10) Patent No.: US 6,529,937 B1
(45) Date of Patent: Mar. 4, 2003

(54) SYSTEM AND METHOD FOR COMMUNICATING CLIENT IP ADDRESSES TO SERVER APPLICATIONS

(75) Inventors: Thomas E. Murphy, Jr., Binghamton, NY (US); Francine M. Orzel, Endicott, NY (US); Paul F. Rieth, Apalachin, NY (US); Jeffrey S. Stevens, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,482

(22) Filed: Jan. 29, 1999

(51) Int. Cl.[7] .............................................. G06F 15/16
(52) U.S. Cl. ...................... 709/203; 709/217; 709/218; 709/219; 709/220; 709/227; 709/228; 709/229; 713/201
(58) Field of Search ................................. 709/203, 227, 709/228, 229, 220, 217, 218, 219; 713/182, 201

(56) References Cited

U.S. PATENT DOCUMENTS

| | | | | |
|---|---|---|---|---|
| 4,625,081 A | * | 11/1986 | Lotito et al. ................... 379/88 |
| 4,885,789 A | | 12/1989 | Burger et al. .................. 380/25 |
| 5,764,887 A | * | 6/1998 | Kells et al. ................... 713/200 |
| 5,768,510 A | | 6/1998 | Gish ....................... 395/200.33 |
| 5,790,548 A | | 8/1998 | Sistanizadeh et al. ........ 370/401 |
| 5,793,763 A | | 8/1998 | Mayers et al. ............... 370/389 |
| 5,812,819 A | | 9/1998 | Rodwin et al. .............. 395/500 |
| 5,931,913 A | * | 8/1999 | Meriwhether et al. ....... 709/227 |
| 5,958,053 A | * | 9/1999 | Denker ......................... 713/201 |
| 6,011,915 A | * | 1/2000 | Aaker et al. ................. 709/203 |
| 6,076,110 A | * | 6/2000 | Murphy, Jr. et al. ......... 709/228 |
| 6,091,737 A | * | 7/2000 | Hong et al. .................. 370/431 |
| 6,154,768 A | * | 11/2000 | Chen et al. .................. 709/203 |
| 6,182,220 B1 | * | 1/2001 | Chen et al. .................. 713/182 |
| 6,216,159 B1 | * | 4/2001 | Chintakrindl et al. ........ 709/220 |
| 6,317,838 B1 | * | 11/2001 | Baize .......................... 713/201 |
| 6,334,146 B1 | * | 12/2001 | Parasnis et al. .............. 709/217 |

OTHER PUBLICATIONS

U.S. patent application Ser. No. 08/808,264, filed Feb. 28, 1997, for "Managing Connection Requests in a Dialup Computer Network".
U.S. patent application Ser. No. 08/897,505, filed Jul. 21, 1997 for "Single Server Access in a Multiple TCP/IP Instance Enviroments".
U. S. patent application Ser. No. 08/198,381, filed Nov. 24, 1998, for "Systems Methods and Computer Program Products for Employing Presumptive Negotiation in a Data Communications Protocol".
Kolban,N. "Intercepting Telnet Data", IBM Technical Disclosure Bulletin, vol. 36, n. 6A, 06–93 pp 505–508.
Kolban, N. "Applications for the TCP/IP Telnet Protocols", IBM Technical Disclosure Bulletin, n. 4B, 09–92, pp. 258–260.
Chintakrindi, R.S. et al, "Method and System for IP Address Accessibility to Server Applications", US patent application Ser. No. 08/978,252 filed Nov. 25, 1997.
S. Alexander, "Telnet Environment Option", RFC 1572, Jan. 1994.

* cited by examiner

Primary Examiner—Ayaz Sheikh
Assistant Examiner—Frantz B. Jean
(74) Attorney, Agent, or Firm—Shelley M Beckstrand

(57) ABSTRACT

A client IP address is communicated to server applications in a secure Telnet client/server system. During a client/server session, the terminal type is first negotiated, followed by negotiation of environment options, including requesting and receiving the client IP address. Upon creating a virtual device for the session, the client address in stored in device associated space in sockaddr_in format where it becomes available to the server applications through the QDCDEVD API.

5 Claims, 4 Drawing Sheets

SYSTEM AND METHOD FOR COMMUNICATING CLIENT IP ADDRESSES TO SERVER APPLICATIONS

CROSS REFERENCES TO RELATED APPLICATIONS

U.S. patent applications Ser. No. 09/239,693, entitled System and Method for Managing Security Objects, now U.S. Pat. No. 6,330,562; Ser. No. 09/240,720, entitled "System and Method for Network Address Translation Integration With IP Security"; Ser. No. 09/239,694, entitled "System and Method for Dynamic Micro Placement of IP Connection Filters"; Ser. No. 09/240,718, entitled "System and Method for Dynamic Macro Placement of IP Connection Filters"; and Ser. No. 09/240,483, entitled "System and Method for Central Management of Connections in a Virtual Private Network, filed concurrently herewith are assigned to the same assignee hereof and contain subject matter related, in certain respects, to the subject matter of the present application. The above-identified patent applications are incorporated herein by reference.

BACKGROUND OF THE INVENTION

1. Technical Field of the Invention

This invention pertains to communications in a client/server session. More particularly, it pertains to communication of client IP addresses to server applications in a TCP/IP Telnet environment.

2. Background Art

TCP/IP Telnet is an application which provides a terminal to a user, which is used to gain access to machines and run other applications as the user desires. In today's environment, more and more users are taking advantage of the increased security offered by firewalls, socks server and secured sockets layer (SSL) servers to protect their data transmissions to and from their terminals. Because of these new secure accesses, the actual client IP address is hidden or remapped, and thus not available to Telnet or other applications. However, over the years thousands of applications have been developed on the TCP/IP Client/Server model and in many cases they've become dependent upon knowing the IP address of the remote Telnet client. With security spoofing of the IP address, it is not safe to make any decisions at the server side based on the client IP address.

It is an object of the invention to enable applications to audit, track and log true client IP addresses over secure protocols.

It is an object of the invention to provide an improved system and method for making available to all applications the actual Client IP address.

It is a further object of the invention to provide a system and method for allowing decisions to be made at the server side in the TCP/IP Client/Server system based on client IP address in a safe manner.

SUMMARY OF THE INVENTION

In accordance with the invention, a system and method is provided for communicating a client IP address to server applications in a secure Telnet client/server system. During a client/server session, the secure connection handshake, including certificate authentication, occurs. Upon successful completion of this handshake, the terminal type is first negotiated, followed by negotiation of environment options, including requesting and receiving the client IP address. Upon creating a virtual device for the session, the client address is stored in device associated space where it becomes available to the server applications.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, Telnet Environment Negotiation options (RFC 1572) is extended by using a custom USERVAR type to exchange actual Client IP address. Once the actual Client IP Address is made available to the Telnet server, it is stored in sockaddr_in format in the Device Associated space, where it may be retrieved by applications via the QDCDEVD API. Hence, the actual Client IP address is made available to all server applications.

Figure 1:
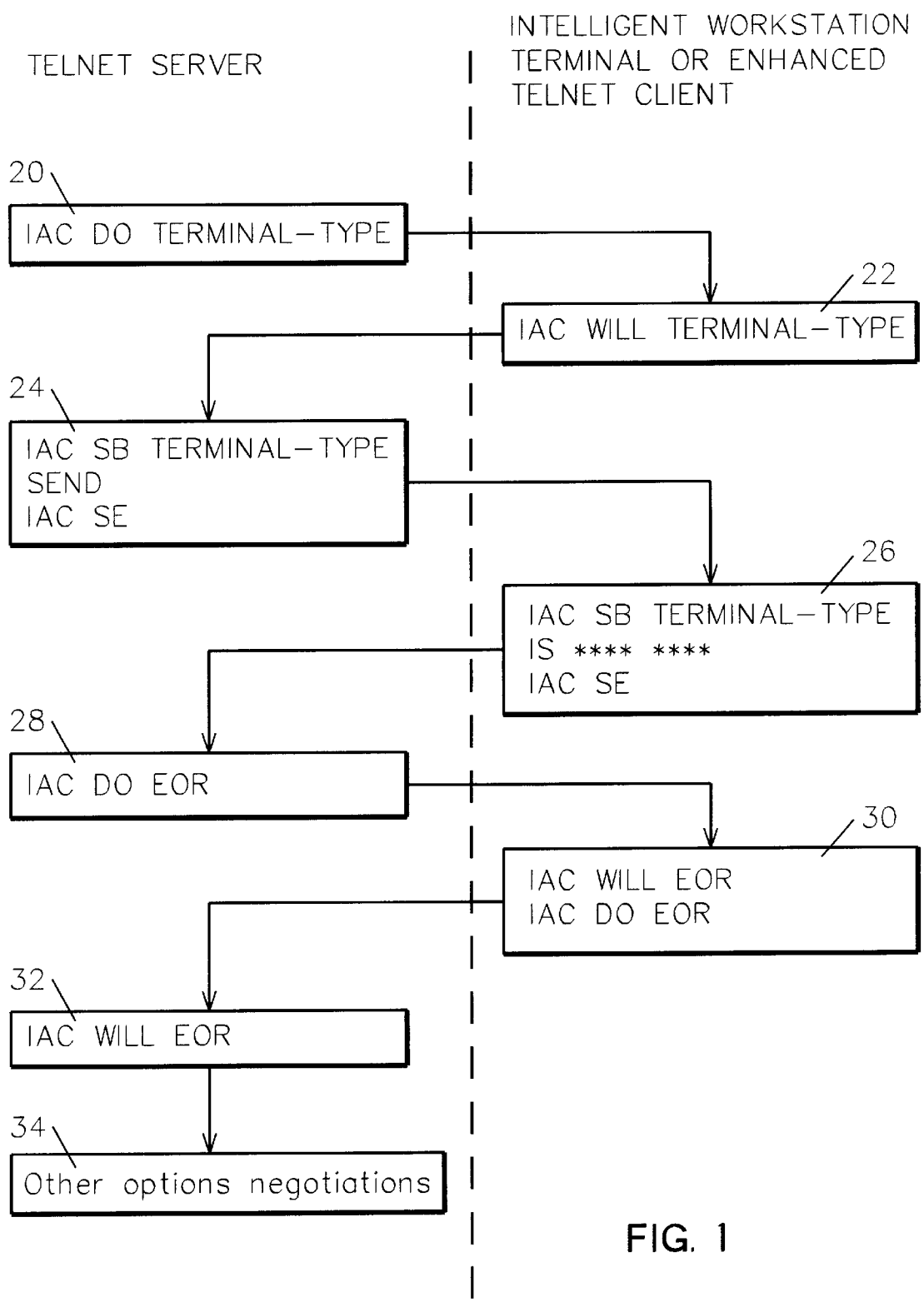
FIG. 1 is a flow diagram illustrating typical client/server communications.
Figure 5:
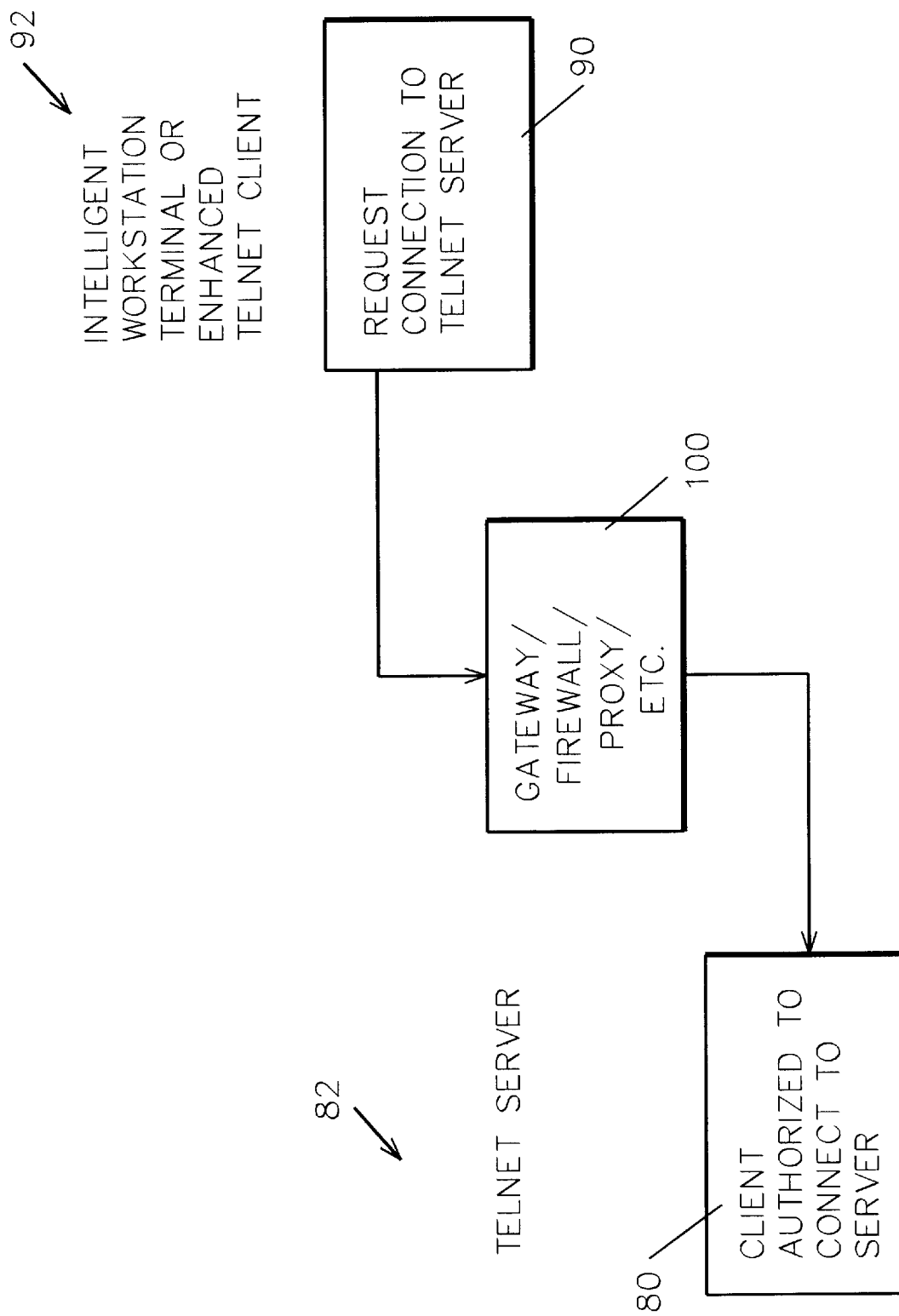
FIG. 5 is a flow diagram illustrating the establishment of a secure connection between a server and a client in accordance with the preferred embodiment of the invention.

Referring to FIG. 1 in connection with FIG. 5, once the secure connection handshake has completed successfully, the Telnet server environment negotiation typically starts with the issuance, by the server, of an invitation 20 to engage in terminal type negotiation with the Telnet client. The client and server then enter into a series of sub-negotiations involving steps 22, 24, 26, 28, 30 and 32 to determine the level of terminal support that will be used. After the terminal type is agreed upon in steps 20–26, the client and server will normally negotiate a required set of additional options, including, for example, end-of-record (EOR) processing, required to support transparent mode or full screen 5250/3270 block mode support. As soon as the required options 34 have been negotiated, the server suspends further negotiations and begins initializing the actual virtual device.

Some negotiations are symmetrical between client and server and some are negotiated in one direction only. Also, it is permissible and common practice to bundle more than one response or request, or combine a request with a response, so the actual exchange of messages may look different in practice than that shown in FIG. 1.

Figure 2:
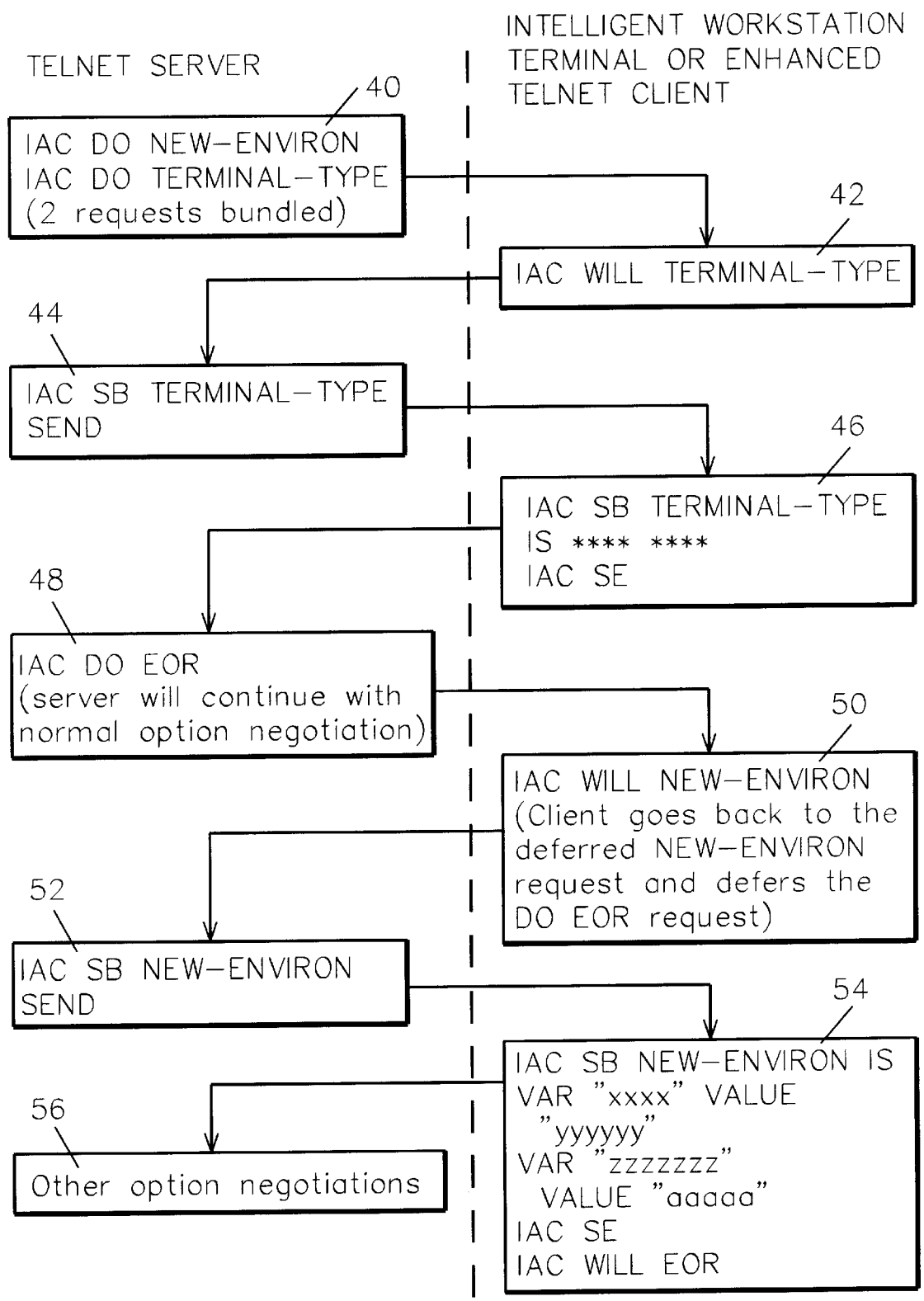
FIG. 2 is a flow diagram illustrating environment negotiations in client/server communications.

Referring to FIG. 2, in order to accommodate new environment option negotiations, once the secure connection handshake of FIG. 5 has completed successfully, the server bundles an environment option invitation along with the standard terminal type invitation request 40 to the client. The client then responds, and can either send a negative acknowledgment or, at some point after completing terminal type negotiations (steps 42–46) but before completing the full set of negotiations required for transparent mode, engage in environment option sub-negotiation (steps 50–54) with the server. A maximum of 1024 bytes of environment strings may be sent to the server in such communication.

Figures 3, 4:
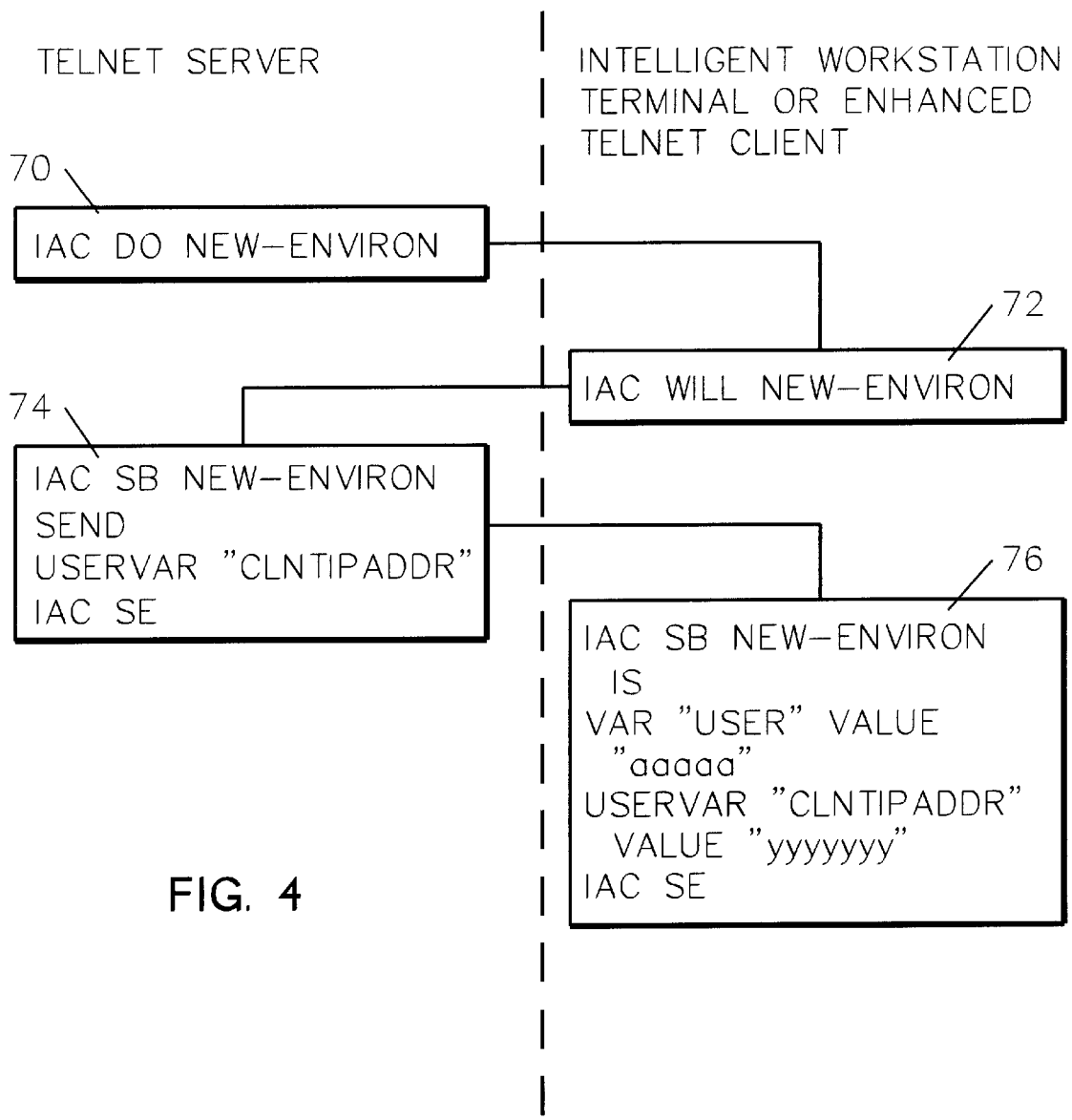
FIG. 3 is diagram illustrating the format of the client IP address in accordance with the preferred embodiment of the invention.
FIG. 4 is a flow diagram illustrating the communication of client IP address in client/server communications in accordance with the preferred embodiment of the invention.

Referring to FIG. 3, in accordance with the preferred embodiment of the invention, a new Telnet server USERVAR 60 CLNTIPADDR is defined for use during NEW_ENVIRON negotiation. This user variable is used by the server to request and receive the actual client IP address VALUE 62, a 16 bit binary address (in one specific embodiment of the invention).

Referring to FIG. 4, the server requests the actual client IP address in step 74, once NEW_ENVIRON option negotiations have been established (steps 70 and 72) and the secure connection handshake of FIG. 5 completed. In step 76 the client responds with the IP address in step 76.

At the server, the received client IP address 62 is stored in device associated space upon creation of the virtual device associated with this session. Any application that requires or desires to use the actual IP address can then use the QDCRDEVD API to retrieve this value.

Referring to FIG. 5, a client, such as an intelligent workstation terminal or an enhanced TELNET client 92, sends request 90 for connection to a server 82, such as a TELNET server, via client application software. In the secure environment, this request 90 passes through an intermediate server 100, such as a gateway, firewall, or proxy, at which point the client IP address is hidden or remapped. The request is then passed on from this intermediate server 100 to the Telnet server 82, which determines that the client 92 issuing request 90 is authorized to connect to server 82. All subsequent negotiations and communications, such as those heretofore described with respect to FIGS. 1, 2 and 4, between client 92 and server 82 follow this same path through intermediate server 100.

Using the system and method of the preferred embodiment of the invention, Telnet server 82 and other applications using TCP/IP may have access to the actual IP address of a client 92 even when that address is hidden or remapped by secure measures, such as firewalls, SSL and Socks servers 100.

ADVANTAGES OVER THE PRIOR ART

It is an advantage of the invention that there is provided a system and method which enables applications to audit, track and log true client IP addresses over secure protocols.

It is a further advantage of the invention that there is provided an improved system and method for making available to all applications the actual Client IP address when using secure connections on the system.

It is a further advantage of the invention that there is provided a system and method for allowing decisions to be made at the server side in the TCP/IP Client/Server system based on client IP address in a safe manner.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Accordingly, the scope of protection of this invention is limited only by the following claims and their equivalents.

We claim:

1. A method for communicating client IP address to server applications in a Telnet client/server system characterized by a network of firewalls, sockets, sock servers and secure SSL connections, comprising the steps of:
   upon completion of secure connection handshake, during a client/server session, negotiating terminal type;
   negotiating environment options, including requesting and receiving said client IP address; and
   creating a virtual device for said session, including storing said client IP address in device associated space;
   thereby assuring that a correct client IP address is received at said server across said network.

2. A method for making available a client IP address to server applications in a Telnet client/server system utilizing secure connections, said system characterized by a network of firewalls, sockets, sock servers and secure SSL connections, comprising the steps, executed during a client/server session at said server, of:
   upon completion of secure connection handshake, bundling for communication to said client a request to engage in terminal type and environment option negotiations;
   prior to completing a full set of negotiations required for transparent mode, engaging in environment option negotiations;
   during said environment option negotiations, requesting and receiving said client IP address; and
   creating a virtual device associated with said session, including storing in device associated space said client IP address;
   thereby assuring that a correct client IP address is received at said server across said network.

3. System for making available a client IP address to server applications in a secure Telnet client/server system characterized by a network of firewalls, sockets, sock servers and secure SSL connections, comprising:
   a first server code object for bundling for communication to said client a request to engage in terminal type and environment option negotiations, upon completion of secure connection handshake;
   a second server code object for engaging in environment option negotiations prior to completing a full set of negotiations required for transparent mode;
   a third server code object for requesting and receiving, during said environment option negotiations, said client IP address; and
   a forth server code object for creating a virtual device associated with said session, including said client IP address in device associated space;
   thereby assuring that a correct client IP address is received at said server across said network.

4. A program storage device readable by a machine, tangibly embodying a program of instructions executable by a machine to perform method steps for making available a client IP address to server applications in a secure Telnet client/server system characterized by a network of firewalls, sockets, sock servers and secure SSL connections, said method steps comprising:
   bundling for communication to said client a request to engage in terminal type and environment option negotiations upon completion of secure connection handshake;
   prior to completing a full set of negotiations required for transparent mode, engaging in environment option negotiations;

during said environment option negotiations, requesting and receiving said client IP address; and creating a virtual device associated with said session, including storing in device associated space said client IP address;

thereby assuring that a correct client IP address is received at said server across said network.

5. An article of manufacture comprising:

a computer useable medium having computer readable program code means embodied therein for making available a client IP address to server applications in a secure Telnet client/server system characterized by a network of firewalls, sockets, sock servers and secure SSL connections, the computer readable program means in said article of manufacture comprising:

computer readable program code means for causing a computer to effect bundling for communication to said client a request to engage in terminal type and environment option negotiations;

prior to completing a full set of negotiations required for transparent mode, engaging in environment option negotiations;

during said environment option negotiations, requesting and receiving said client IP address; and creating a virtual device associated with said session, including storing in device associated space said client IP address;

thereby assuring that a correct client IP address is received at said server across said network.

* * * * *